(12) United States Patent
Ochiai

(10) Patent No.: US 6,435,549 B1
(45) Date of Patent: *Aug. 20, 2002

(54) AIR BAG DEVICE

(75) Inventor: Fumiharu Ochiai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/716,205

(22) Filed: Nov. 21, 2000

(30) Foreign Application Priority Data

Nov. 22, 1999 (JP) .......... 11-330899
Feb. 7, 2000 (JP) .......... 2000-34340

(51) Int. Cl.$^7$ .......... B60R 21/32
(52) U.S. Cl. .......... 280/735; 280/736; 280/739; 280/742
(58) Field of Search .......... 280/736, 739, 280/742, 735

(56) References Cited

U.S. PATENT DOCUMENTS

| | | | | |
|---|---|---|---|---|
| 5,366,241 A | * | 11/1994 | Kithil | 280/735 |
| 5,388,860 A | * | 2/1995 | Brede et al. | 280/739 |
| 5,670,853 A | * | 9/1997 | Bauer | 318/286 |
| 5,695,214 A | * | 12/1997 | Faigle et al. | 280/735 |
| 5,707,078 A | * | 1/1998 | Swanberg et al. | 280/739 |
| 5,709,405 A | * | 1/1998 | Saderholm et al. | 280/736 |
| 5,743,558 A | * | 4/1998 | Seymour | 280/739 |
| 5,769,452 A | * | 6/1998 | Yoshida | 280/735 |
| 5,820,162 A | * | 10/1998 | Fink | 280/736 X |
| 5,853,192 A | * | 12/1998 | Sikorski et al. | 280/739 |
| 6,017,056 A | * | 1/2000 | Lee | 280/739 |
| 6,039,346 A | * | 3/2000 | Ryan et al. | 280/736 |
| 6,241,279 B1 | * | 6/2001 | Ochiai | 280/735 |

FOREIGN PATENT DOCUMENTS

| | | |
|---|---|---|
| JP | 5-6206 | 2/1993 |
| JP | 9-301115 | 11/1997 |
| JP | 11-334519 | 12/1999 |

* cited by examiner

*Primary Examiner*—Paul N. Dickson
*Assistant Examiner*—Toan C To
(74) *Attorney, Agent, or Firm*—Armstrong, Westerman & Hattori, LLP (57) ABSTRACT

A vent hole disposed in a retainer, which supports an inflator and an air bag of an air bag device, is opened and closed by a control valve including a plate-shaped valve member. The valve member of the control valve includes a body reinforced by a flange, and a piezoelectric element operates as an actuator affixed to a hinge portion provided at one end of the body. The piezoelectric element is supplied with an electric current and is contracted to bend the hinge portion, whereby the vent hole is opened by movement of the body. The piezoelectric element is provided on the hinge portion of the valve member and hence, the size of the piezoelectric element can be reduced, whereby the amount of expensive piezoelectric element used can be reduced to contribute to a reduction in cost, as compared with a case in which the piezoelectric element is superposed on the entire valve member of the valve member.

3 Claims, 12 Drawing Sheets

AIR BAG DEVICE

BACKGROUND OF THE INVENTION

1. Field of the Invention

The present invention relates to an air bag device including an inflator accommodated in a retainer to which a peripheral edge of an opening in a folded-up air bag is fixed, the air bag being adapted to be deployed by a gas generated by the inflator upon collision of a vehicle, and a control valve capable of opening and closing a vent hole defined in the retainer.

2. Description of the Related Art

In a conventional air bag device, a vent hole is provided in an air bag which is expanded by a gas generated by an inflator, so that a portion of the gas is discharged through the vent hole to control the internal pressure in the air bag. There is such a proposed air bag device, in which the air bag is expanded immediately at an initial stage of the deployment by previously closing the vent hole by a thin membrane and, when the deployment is completed to increase the internal pressure in the air bag, the thin membrane is broken, whereby the gas is discharged through the vent hole to softly restrain an occupant (see Japanese Utility Model Publication No.5-6206).

There is also a proposed air bag device including two inflators mounted therein, so that when no occupant exists in the vicinity of the air bag device, both of the inflators are ignited, and when an occupant exists in the vicinity of the air bag device, only one of the inflators is ignited, thereby controlling the speed of deployment of an air bag and the internal pressure in the air bag in accordance with the position of the occupant (see Japanese Patent Application Laid-open No.9-301115).

The air bag device described in Japanese Utility Model Publication No.5-6206 suffers from a problem that a dispersion in pressure is liable to be generated for breaking the thin membrane and for this reason, when an internal pressure in the air bag has reached a predetermined value, it is difficult to properly open the vent hole. Also, the vent hole, once opened, cannot be closed and hence, it is difficult to accurately control the internal pressure. The air bag device described in Japanese Patent Application Laid-open No.9-301115 suffers from a problem that the two inflators are required, resulting in not only an increase in number of parts to cause an increase in cost, but also the deployment of the air bag can be controlled only in two stages and hence, it is difficult to carry out a close control.

There is also an air bag device proposed by the present applicant, wherein a vent hole is disposed in a retainer having an inflator accommodated therein, so that the speed of deployment of an air bag and the internal pressure in the air bag are controlled closely by opening and closing the vent hole by a control valve (see Japanese Patent Application No.10-143781).

However, the air bag device proposed in Japanese Patent Application No.10-143781 suffers from the following problem: In such air bag, the control valve comprises a piezoelectric element bonded to a protector which is made of a strip-shaped metal plate and which has the same shape as the protector, so that the protector is curvedly deflected along with the piezoelectric element by supplying an electric current to the piezoelectric element to open a vent hole. For this reason the expensive piezoelectric element is increased in size, causing an increase in cost.

SUMMARY OF THE INVENTION

Accordingly, it is an object of the present invention to provide an air bag device including a control valve capable of opening and closing a vent hole disposed in a retainer, wherein the size of an actuator required for the control valve is reduced to provide a reduction in cost.

To achieve the above object, according to a first aspect and feature of the present invention, there is provided an air bag device comprising an inflator accommodated in a retainer to which a peripheral edge of an opening in a folded-up air bag is fixed, so that the air bag is deployed by a gas generated by the inflator upon collision of a vehicle to restrain an occupant, and a control valve capable of opening and closing a vent hole disposed in the retainer, wherein the control valve includes a valve member adapted to close the vent hole, and an actuator provided on a hinge portion of the valve member, so that an electric current is supplied to the actuator operative to bend the valve member at the hinge portion, thereby opening the vent hole.

With the above arrangement, when the air bag is deployed by a high-pressure gas generated by the inflator, the opening degree of the vent hole permitting the high-pressure gas to escape is controlled by the control valve. Thus, each of the intensity of a restraining force provided by the air bag, the speed of contraction of the air bag, and the like, can be set at any value in accordance with the state of collision of the vehicle and the condition of an occupant. In addition, since the actuator is provided on the hinge portion of the valve member, the slight movement of the actuator can be enlarged to operate the valve member in a large way. Thus, the size of the actuator can be reduced to provide a reduction in cost.

According to a second aspect and feature of the present invention, in addition to the first feature, the actuator is a piezoelectric element. With this arrangement, the size of the actuator can be reduced remarkably by employment of the piezoelectric element.

According to a third aspect and feature of the present invention, in addition to the first feature, the valve member of the control valve covers the vent hole from the outside of the retainer. With such arrangement, the valve member of the control valve covers the vent hole from the outside of the retainer having the inflator accommodated therein. Therefore, even if the control valve is not opened sufficiently due to a lack of the operation or the non-operation of the actuator, the control valve can be forcibly opened by an increase in internal pressure in the retainer to prevent the internal pressure from being excessively increased.

The above and other objects, features and advantages of the invention will become apparent from the following description of the preferred embodiment taken in conjunction with the accompanying drawings.

BRIEF DESCRIPTION OF THE DRAWINGS

FIGS. 1 to 15 show an embodiment of the present invention, wherein

DESCRIPTION OF THE PREFERRED EMBODIMENT

The present invention will now be described by way of an embodiment with reference to the accompanying drawings.

Figure 1:
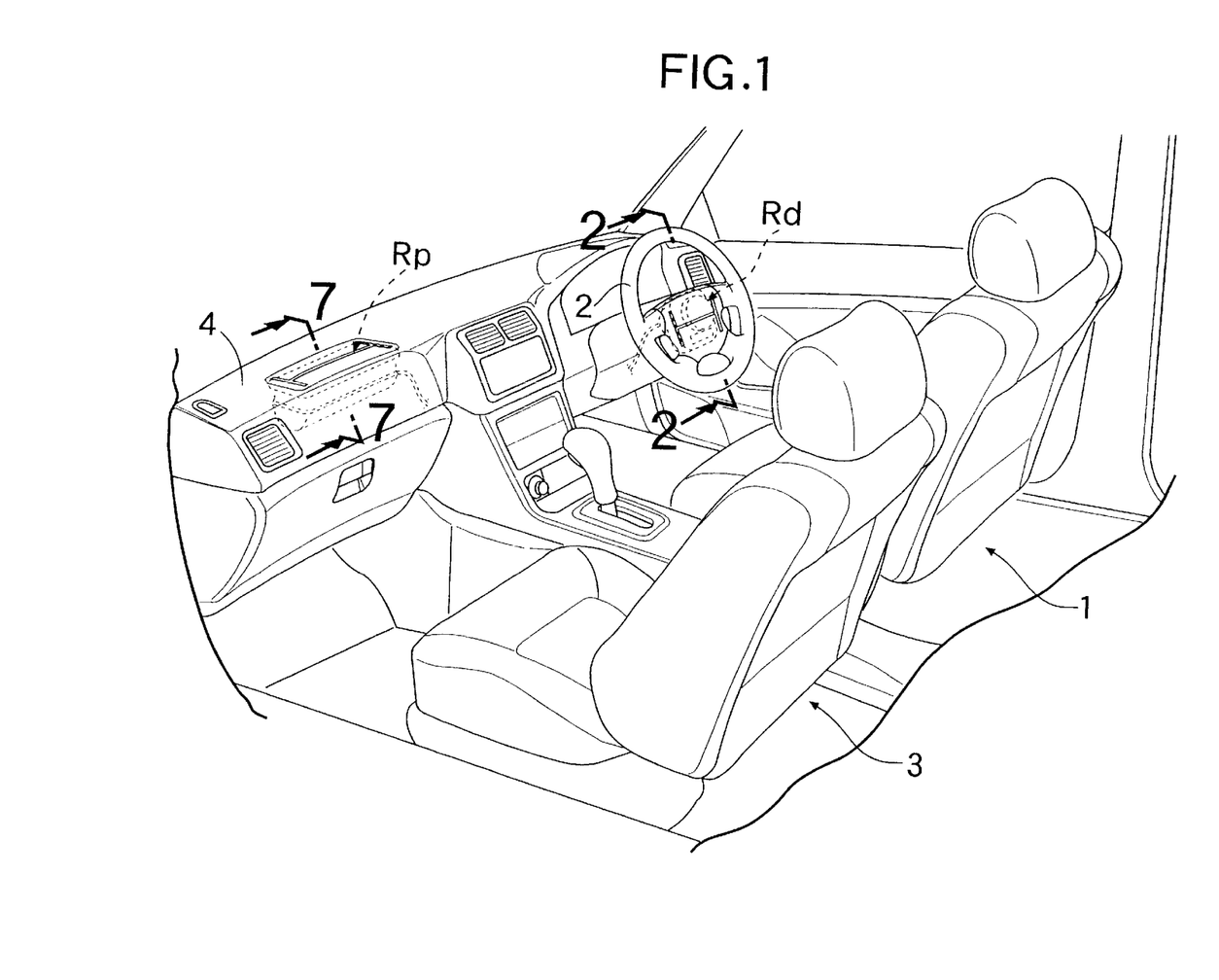
FIG. 1 is a perspective view of a front portion of a vehicle compartment in an automobile incorporating the present invention.
Figure 2:
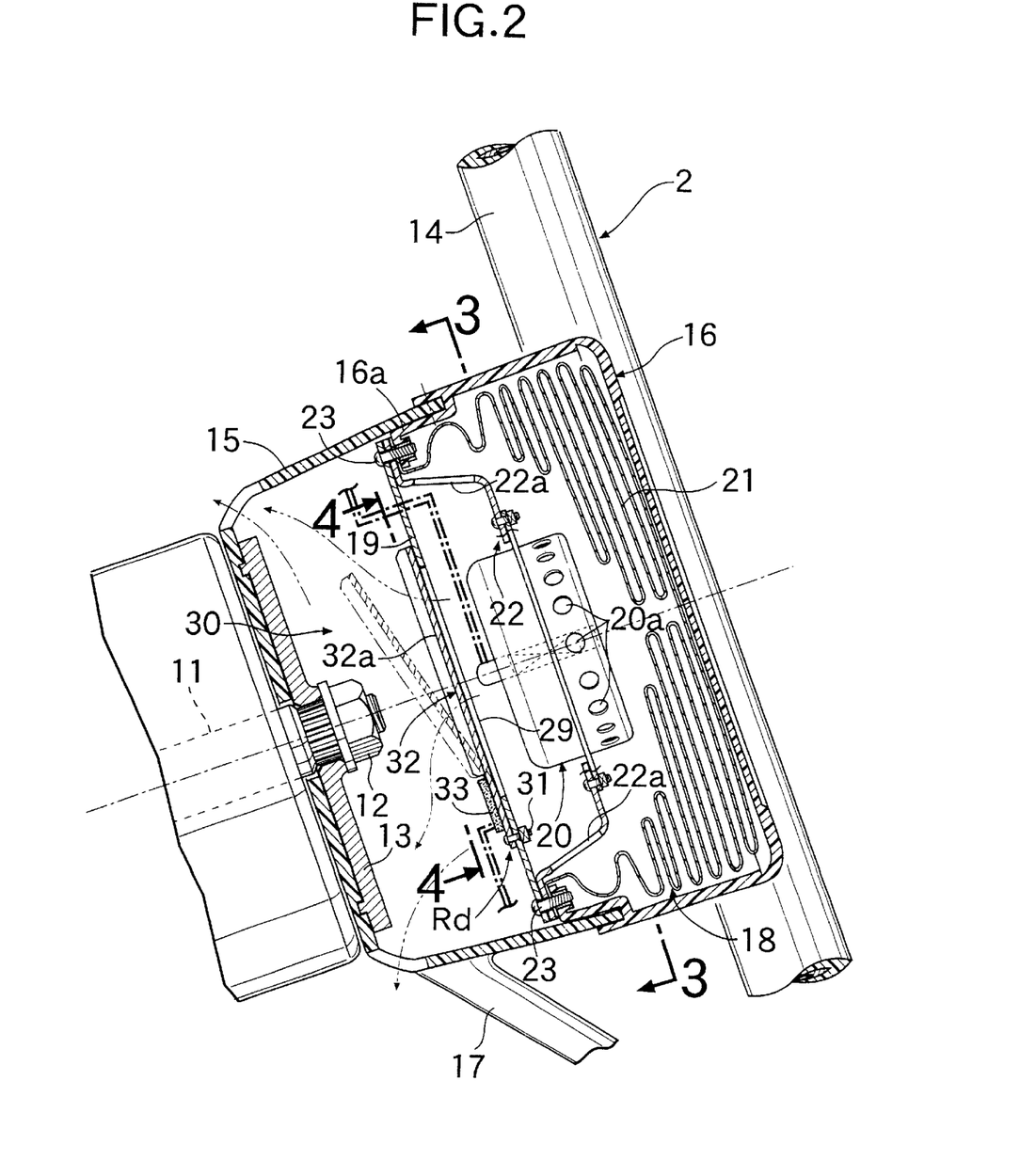
FIG. 2 is an enlarged sectional view taken along a line 2—2 in FIG. 1.
Figure 3:
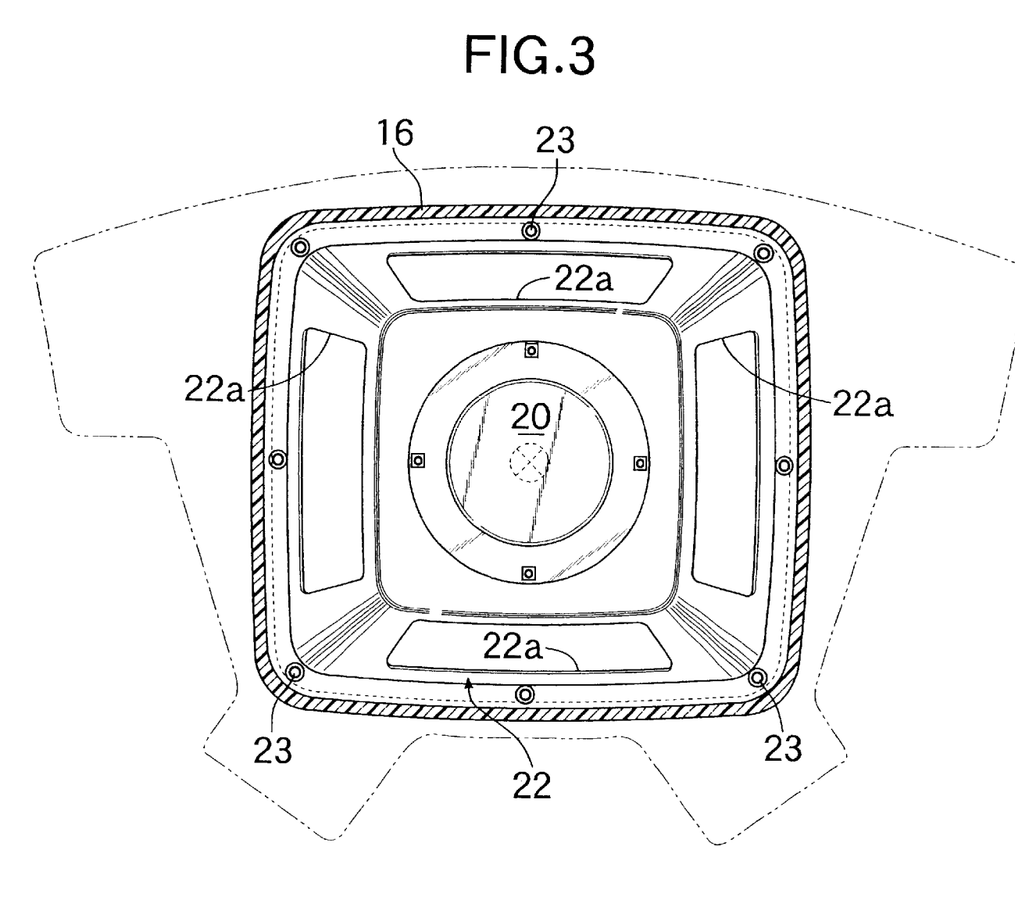
FIG. 3 is a sectional view taken along a line 3—3 in FIG. 2.
Figure 4:
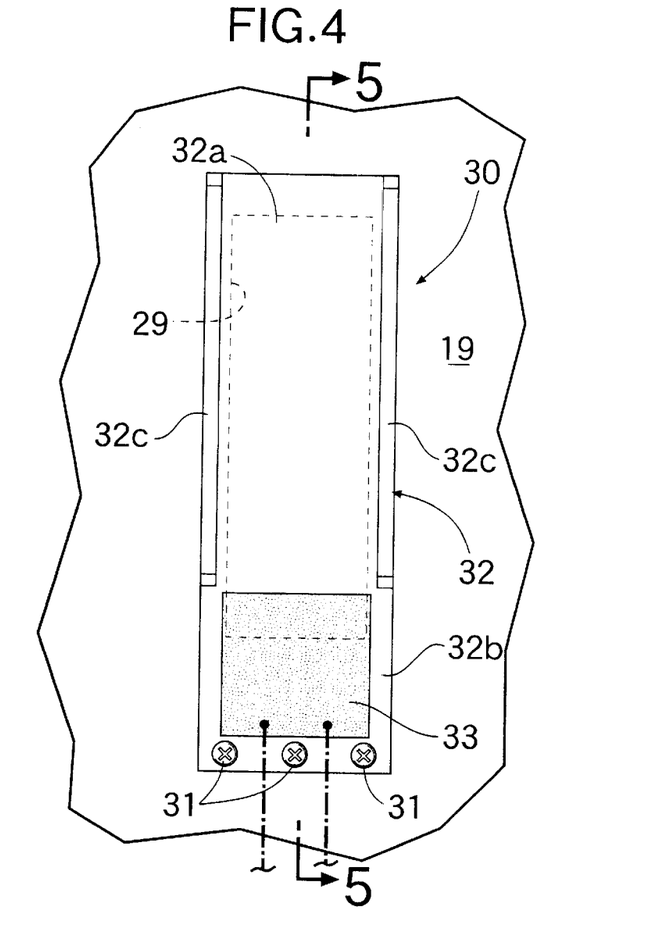
FIG. 4 is an enlarged view taken along a line 4—4 in FIG. 2.

Referring to FIG. 1, an air bag device Rd for a driver's seat 1 is mounted in a central portion of a steering wheel 2 disposed forwardly of the driver's seat 1, and an air bag device Rp for a passenger's seat 3 is mounted in an upper portion of a dashboard disposed forwardly of the passenger's seat 3.

The structure of the air bag device Rd for the driver's seat will be described below with reference to FIGS. 2 to 6.

The steering wheel 2 includes a steering boss 13 fitted relatively non-rotatably over a rear end of a steering shaft 11 and fixed to the rear end by a nut 12, an annular wheel rim 14 disposed to surround the steering boss 13, a front cover 15 fixed to the steering boss 13, a rear cover 16 coupled to the front cover 15, and a plurality of spokes 17 which connect the front cover 15 to the wheel rim 14. An air bag module 18 is accommodated in a space defined by the front cover 15 and the rear cover 16.

The air bag module 18 is comprised of a retainer 19 for supporting the air bag module 18 in the rear cover 16, an inflator 20 generating a high-pressure gas, and an air bag 21 which is expanded by the high-pressure gas generated by the inflator 20. An outer periphery of the quadrilateral plate-shaped retainer 19, an outer periphery of a bracket 22 supporting the inflator 20 at its central portion and a peripheral edge of an opening of the air bag 21 are superposed together and commonly clamped by a plurality of bolts 23 to a mounting flange 16a integrally formed around an inner periphery of the rear cover 16. The inflator 20 has gas ejecting bores 20a, which open into an internal space in the air bag 21. The internal space in the air bag 21 communicates with a space sandwiched between the bracket 22 and the retainer 19 through four through-holes 22a defined in the bracket 22.

A rectangular vent hole 29 is disposed in the retainer 19 facing the bracket 22. A control valve 30 for controlling the opening degree of the vent hole 29 includes a valve member 32 formed into a strip shape and fixed at one lengthwise end thereof to an outer surface of the retainer 19 by bolts 31. The valve member 32 is comprised of a body 32a of a size to cover the vent hole 29 and having a hinge portion 32b provided on the body 32a at a location near the bolts 31. To enhance the rigidity of the body 32a of the valve member 32, flanges 32c, 32c are formed by bending lengthwise opposite edges of the body 32a. A piezoelectric element 33 that operates as an actuator is bonded to a back of the hinge portion 32b in order to bend the valve member 32 at the hinge portion 32b.

Figure 12:
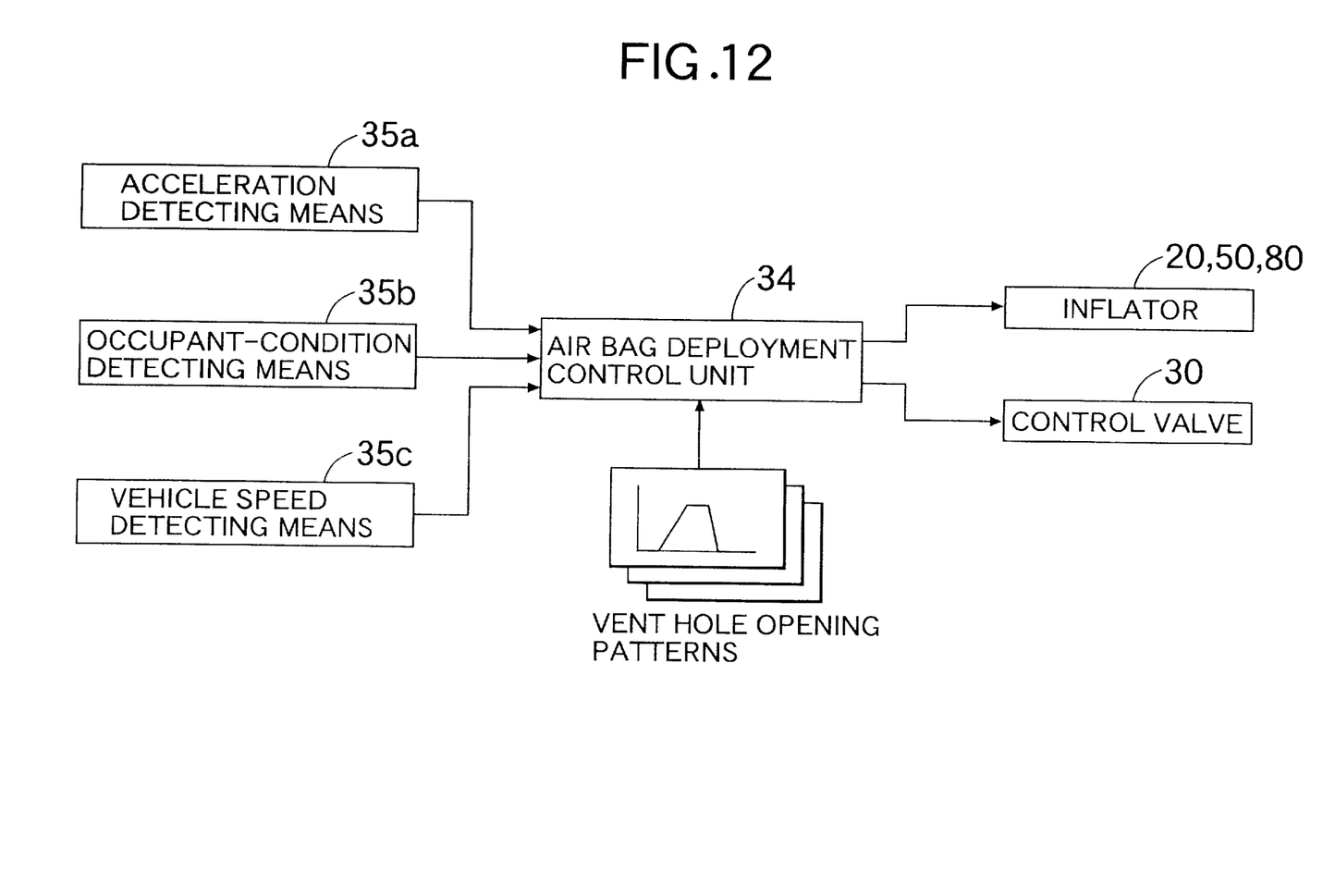
FIG. 12 is a block diagram showing a system for controlling the opening degree of a vent hole.

As shown in FIG. 12, connected to an air bag deployment control unit 34 are an acceleration detecting means 35a for detecting an acceleration upon collision of a vehicle, an occupant-state detecting means 35b for detecting an occupant condition, such as the weight of the occupant, the physical constitution, the sitting attitude, and the like, of the occupant, and a vehicle speed detecting means 35c for detecting a vehicle speed. The occupant-condition detecting means 35b comprises a means mounted in a seat cushion and is adapted to distinguish an adult and a child from each other by detecting the physical constitution of the occupant, or a means adapted to distinguish an adult and a child from each other by detecting the sitting height of the occupant by infrared rays.

The air bag deployment control unit 34 is designed so that when an acceleration equal to, or higher than, a predetermined value has been detected upon collision of the vehicle, the inflator 20 is ignited, and the air bag 21, expanded by the gas generated by the inflator 20, breaks a thin tear-off line 16b (see FIG. 6) formed into an H-shape in the rear cover 16 to deploy into the vehicle compartment. At this time, the air bag deployment control unit 34 controls the supply of electric current to the piezoelectric element 33 of the control valve 30 based on a signal from the occupant-condition detecting means 35b or the vehicle speed detecting means 35c to change the opening degree of the vent hole 29.

Figure 5:
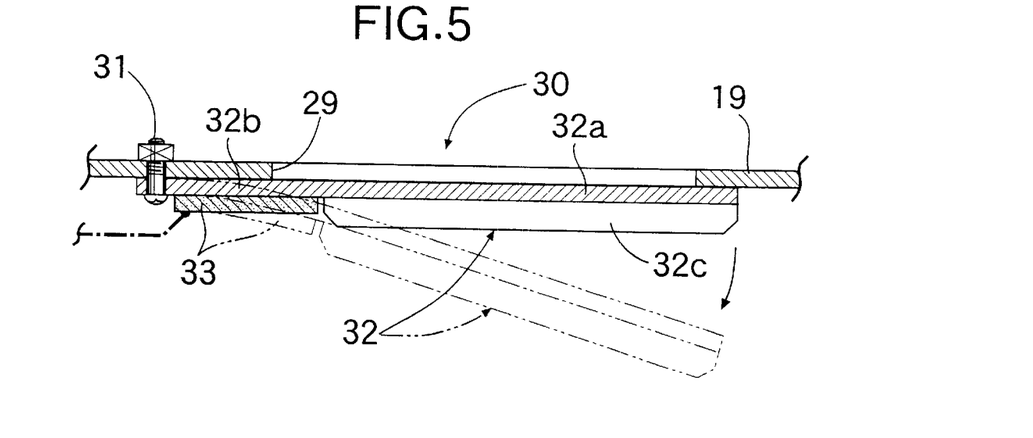
FIG. 5 is a sectional view taken along a line 5—5 in FIG. 4.
Figure 6:
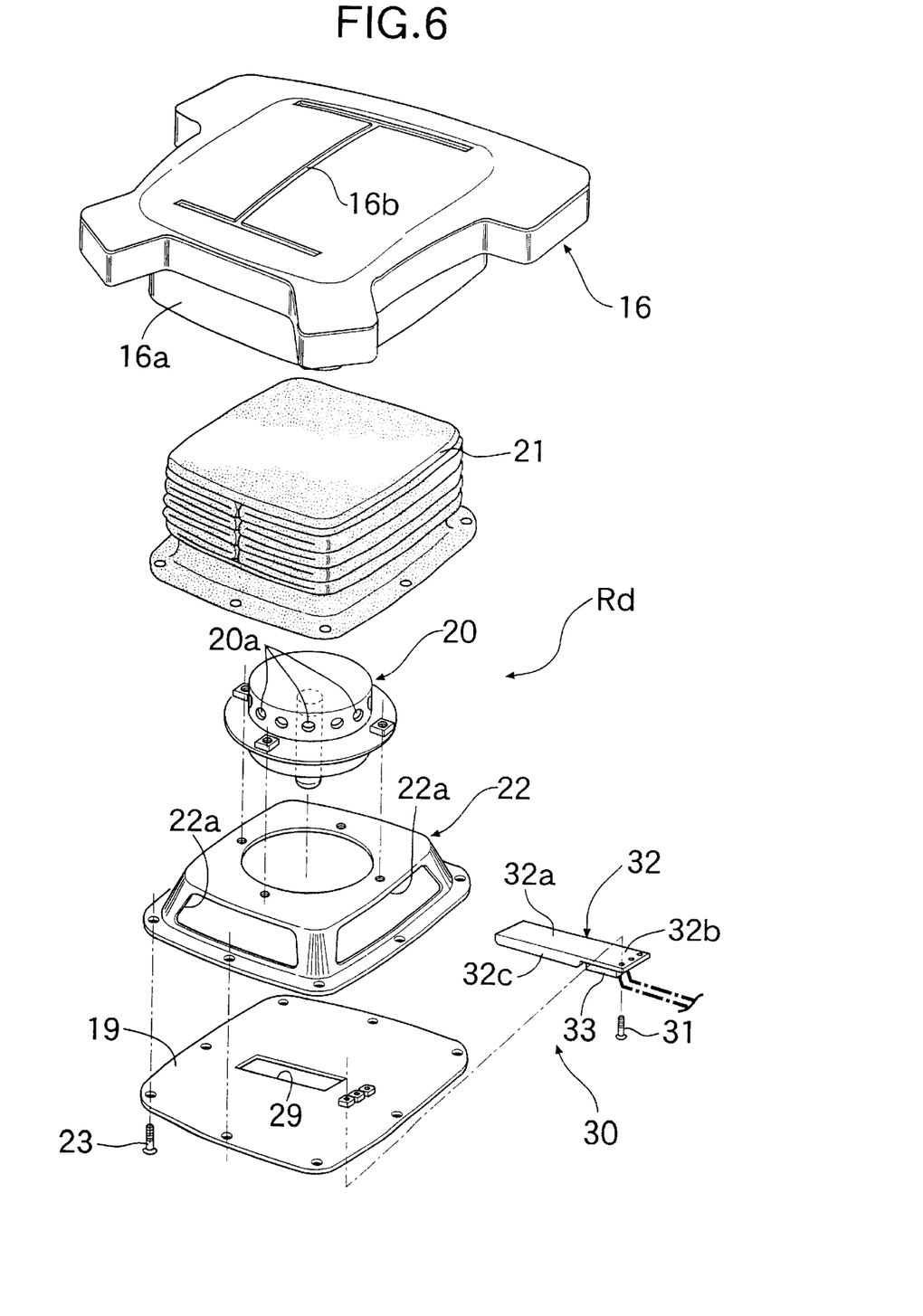
FIG. 6 is an exploded perspective view of an air bag device according to the invention for a driver's seat.
Figure 7:
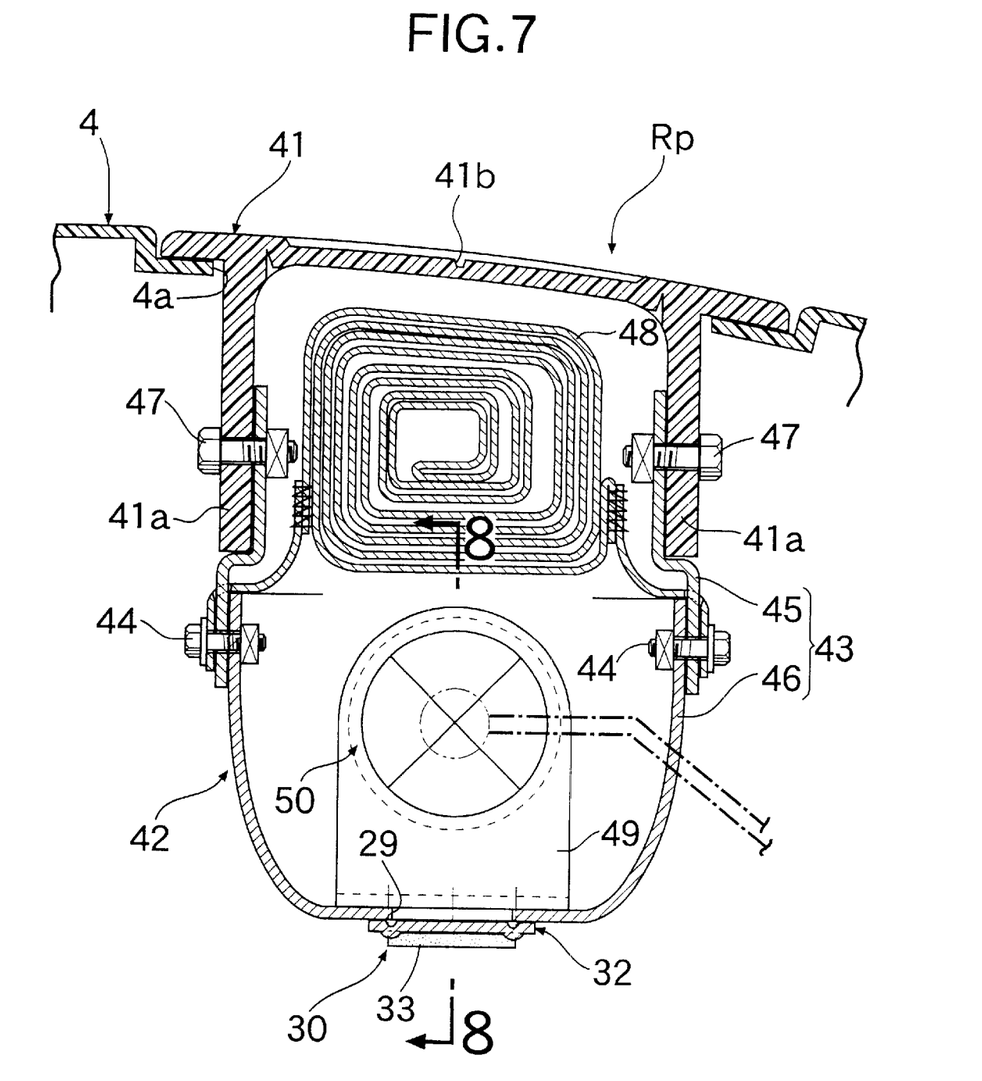
FIG. 7 is an enlarged sectional view taken along a line 7—7 in FIG. 1.
Figure 8:
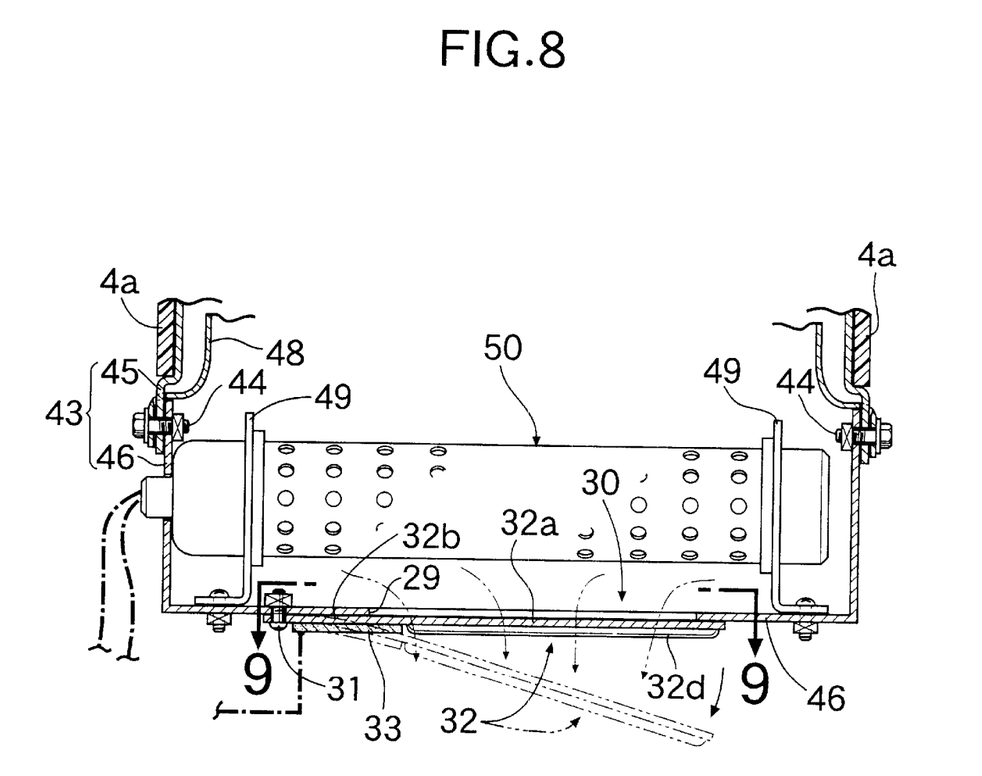
FIG. 8 is a sectional view taken along a line 8—8 in FIG. 7.
Figure 9:
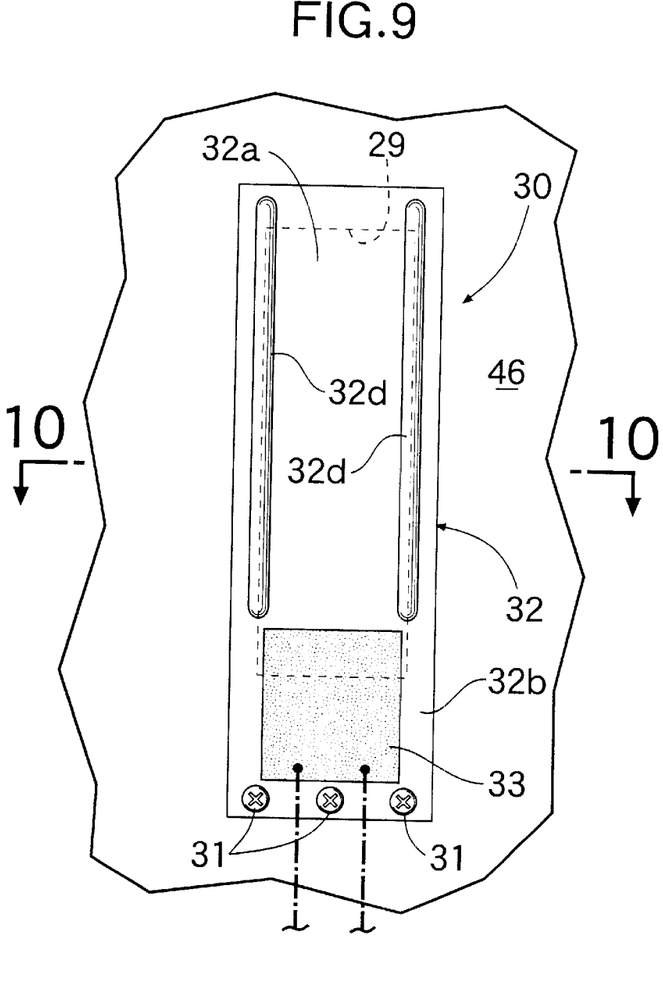
FIG. 9 is an enlarged view taken along a line 9—9 in FIG. 8.
Figure 10:
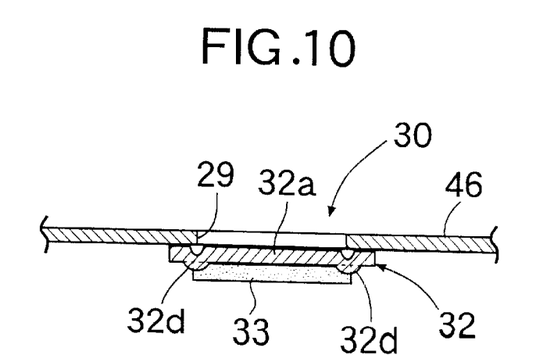
FIG. 10 is a sectional view taken along a line 10—10 in FIG. 9.
Figure 11:
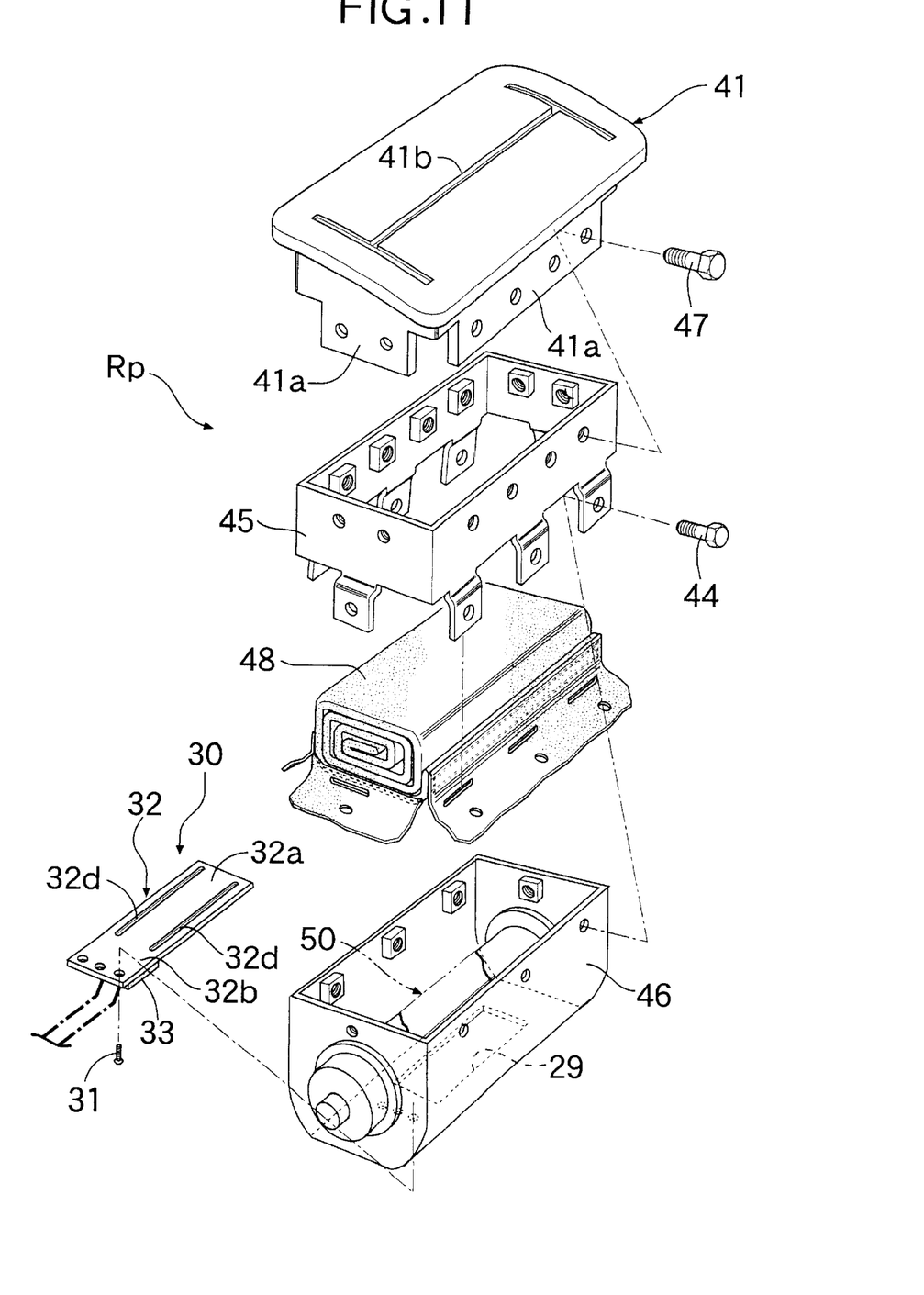
FIG. 11 is an exploded perspective view of an air bag device according to the invention for a passenger's seat.

More specifically, when the electric current is not supplied to the piezoelectric element 33, the hinge portion 32b of the valve member 32 of the control valve 30 extends rectilinearly as shown by a solid line in FIG. 5, and the body 32a connected to the hinge portion 32b closes the vent hole 29. When the electric current is supplied to the piezoelectric element 33 from this state, the piezoelectric element 33 is contracted in accordance with an amount of current supplied, as shown by a dashed line in FIG. 5 and hence, the hinge portion 32b of the valve member 32 is curved, whereby the body 32a opens the vent hole 29.

In this way, the opening degree of the vent hole 29 can be controlled accurately and in a stepless manner by an extremely simple structure in which the electric current is only supplied to the piezoelectric element 33 mounted on the valve member 32 covering the vent hole 29 to bend the hinge portion 32b. Moreover, the piezoelectric element 33 is mounted only at the hinge portion 32b of the valve member 32 of the control valve and hence, the amount of expensive piezoelectric element 33 used can be decreased to contribute to a reduction in cost. Also, the slight movement of the piezoelectric element 33 can be transmitted in an enlarged manner to the valve member 32, as compared with a case in which the piezoelectric element 33 is mounted on the entire surface of the body 32a of the valve member 32. In addition, the rigidity of the body 32a of the valve member 32 is increased by the flanges 32c, 32c and hence, the body 32a can be put in close contact with the retainer 19 to reliably close the vent hole 29.

The valve member 32 covers the vent hole 29 from the outer surface of the retainer 19 (from the surface opposite to the surface faced by the inflator 20) and hence, even if the valve member 32 is not opened sufficiently due to a lack of operation, or the non-operation, of the piezoelectric element 33 when the inflator 20 has generated the high-pressure gas, the valve member 32 can be forcibly opened to the outside by an increase in pressure of the gas in the retainer 19, thereby preventing the internal pressure in the air bag 21 from being excessively increased.

In practice, a plurality of opening patterns for the vent hole 29; namely, the variation in opening degree of the vent hole 29, has been stored in advance as a map. The air bag deployment control unit 34 controls the control valve 30 by selecting a predetermined one of the opening patterns. The particular contents of the control of the opening degree of the control valve 30 will be described in detail hereinafter.

The structure of the air bag device Rp for the passenger's seat will be described below with reference to FIGS. 7 to 11.

A retainer 43 of an air bag module 42 is fixed to support portions 41a extending downwardly from a lid 41 which is fixed in an opening 4a defined in an upper surface of the dashboard 4. The retainer 43 is comprised of an upper retainer part 45 and a lower retainer part 46, which are fixed to each other by a plurality of bolts 44. The upper retainer part 45 is fixed to the support portions 41a of the lid 41 by a plurality of bolts 47. The peripheral edge of the opening in the air bag 48 is sandwiched between the coupled portions of the upper and lower retainer parts 45 and 46 and clamped by the bolts 48. The lid 41 is formed with the thin tear-off line 41b to be broken when the air bag 48 is expanded. A cylindrical inflator 50 is supported on a bottom of the lower retained part 46 with a pair of mounting brackets 49, 49 interposed therebetween.

The control valve 30 for opening and closing the rectangular vent hole 29 defined in the bottom of the lower retainer part 46 has substantially the same structure as that of the air bag device Rd for the driver's seat, and is designed so that the hinge portion 32b is bent by supplying electric current to the piezoelectric element 33 mounted on the hinge portion 32b of the valve body 32, thereby moving the body 32a away from the vent hole 29. However, the control valves 30 of the air bag devices Rd and Rp for the driver's and passenger's seats are different from each other in that the valve element 32 of the control valve 30 of the air bag device Rd for the driver's seat provides the rigidity to the body 32a by the flanges 32c, 32c, and the valve member 32 of the control valve 30 of the air bag device Rp for the passenger's seat provides the rigidity to the body 32a by means of beads 32d, 32d. Except for this point, the control valves 30 have the same structure and function.

The supply of electric current to the inflator 50 and the control valve 30 is controlled by the air bag deployment control unit 34 to which a signal from the occupant condition detecting means 35b or the vehicle detecting means 35c is input. More specifically, when the acceleration detecting means 35a detects an acceleration equal to, or higher than, a predetermined value upon collision of the vehicle, the inflator 50 is ignited by a command from the air bag deployment control unit 34 to generate a high-pressure gas, whereby the air bag 48 expanded by the pressure of the high-pressure gas breaks the tear-off line 41b to deploy into the vehicle compartment. At this time, the opening degree of the control valve 30 is controlled by the signals from the occupant condition detecting means 35b and the vehicle detecting means 35c.

The contents of the control of the opening and closing of the vent hole 29 in each of the air bag devices Rd and Rp for the driver's and passenger's seats will be described specifically with reference to FIGS. 13A to 15.

Figure 13A:
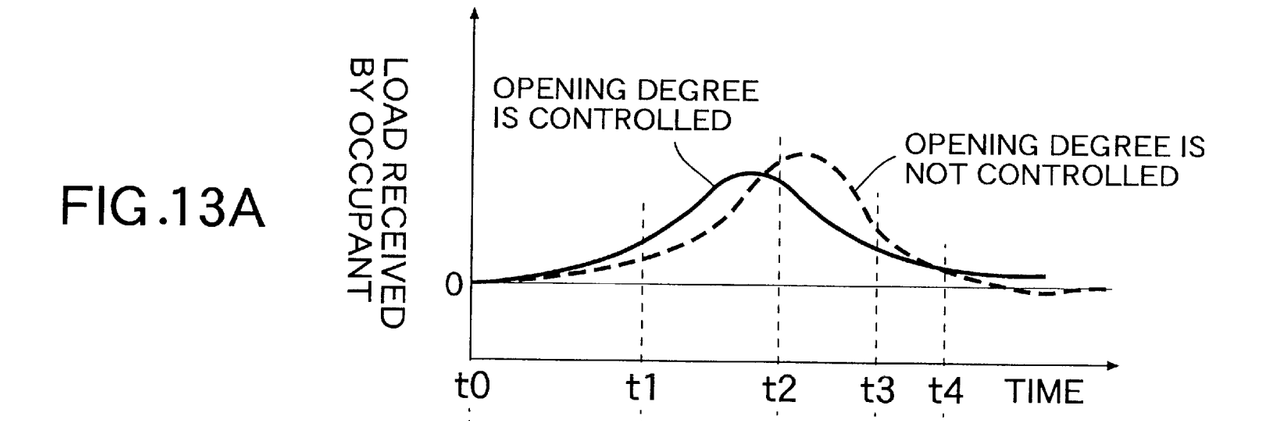
FIG. 13A is a diagram showing one example of a variation in load received by an occupant.

The axis of the abscissa in FIG. 13A indicates the time lapsed from the completion of the deployment of each of the air bags 21 and 48, and the axis of the ordinate indicates the magnitude of a load received by the occupant from each of the air bags 21 and 48. The axis of the abscissa in FIG. 13B likewise indicates the time lapsed from the completion of the deployment of each of the air bags 21 and 48, and the axis of the ordinate indicates the opening degree of the vent hole 29 (wherein the opening degree corresponding to the fully opened state is defined as 100%). In each of FIGS. 13A and 13B, a dashed line corresponds to the prior art in which a vent hole having a fixed area is provided in each of the air bags 21 and 48, and a solid line corresponds to the present invention in which the opening degree of the vent hole 29 defined in the retainer 19 is controlled by the control valve 30.

Figure 13B:
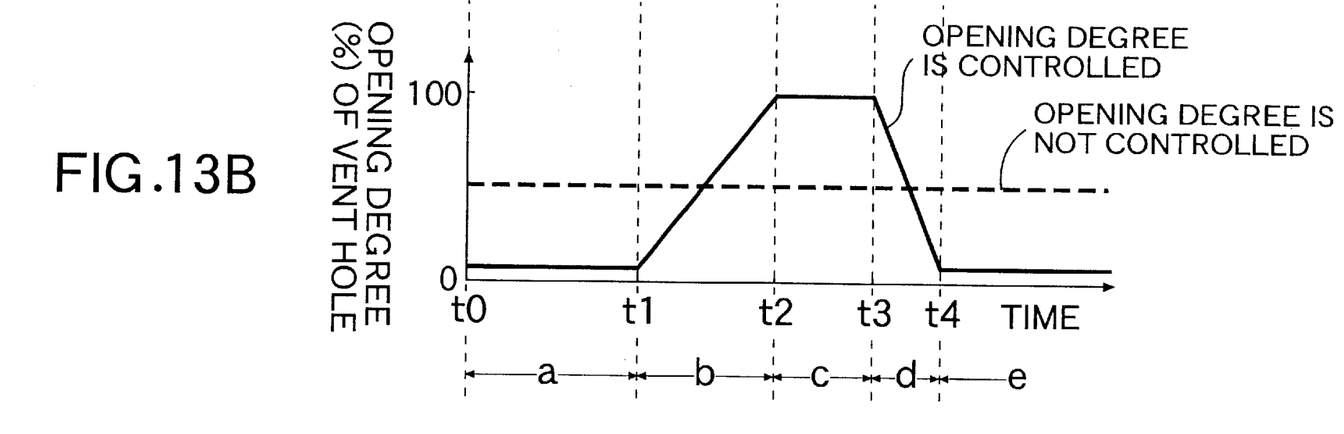
FIG. 13B is a diagram showing one example of an opening pattern for the vent hole.

As is apparent from FIGS. 13A and 13B, in the present invention, the opening degree of the vent hole 29 is suppressed to a small value in a region a of from a time point t0 to a time point t1 to make the discharge of the gas from the air bag 21, 48 difficult, thereby increasing an initial restraining load at the time when the occupant, moved forwardly by inertia upon the collision of the vehicle, starts to push the air bag 21, 48. In a subsequent region b of from the time point t1 to a time point t2, the opening degree of the vent hole 29 is increased, and in a region c of from the time point t2 to a time point t3, the opening degree of the vent hole 29 is maintained at a large value, thereby decreasing the maximum value of the restraining load received by the occupant from the air bag 21, 48, whereby the occupant is restrained softly. In a subsequent region d of from the time point t3 to a time point t4, the opening degree of the vent hole 29 is decreased, and in a region e after the time point t4, the opening degree of the vent hole 29 is suppressed to a small value to make the discharge of the gas from the air bag 21, 48 difficult. This ensures that the air bag 21, 48 is prevented from being contracted early, thereby sufficiently moderating the shock of the secondary collision of the occupant against the steering wheel 2 or the dashboard 4.

In this way, the opening degree of the vent hole 29 is controlled in accordance with the opening pattern established in advance and hence, the characteristic of the load received by the occupant from the air bag 21, 48 can be controlled, as desired, to approach an ideal characteristic.

Figure 14:
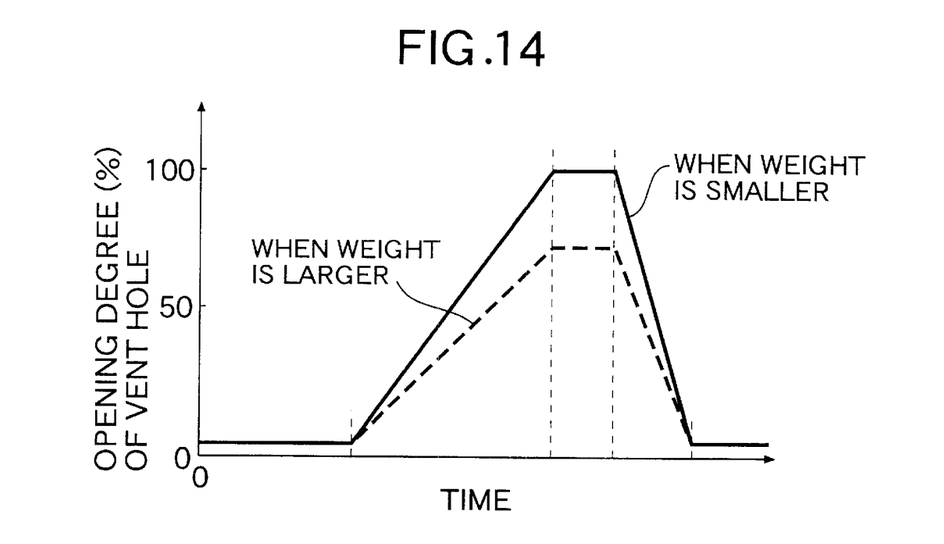
FIG. 14 is a diagram showing a variation in opening pattern for the vent hole due to the condition of an occupant.

The opening pattern of the vent hole 29 is changed in accordance with the result of detection provided by the occupant-condition detecting means 35b. More specifically, as shown in FIG. 14, when the weight of an occupant is smaller, the fully opening degree of the vent hole 29 is set at 100%, but when the weight of an occupant is larger, the fully opening degree is gradually decreased from 100% to, for example, 70% in accordance with an increase in weight. The reason is that, if the fully opening degree of the vent hole 29 is too large when the weight of the occupant is larger, there is a possibility that the amount of gas discharged through the vent hole 29 is excessively increased due to the load of compression of the air bag 21, 48 by the occupant, whereby the air bag 21, 48 cannot be maintained in its expanded state.

Figure 15:
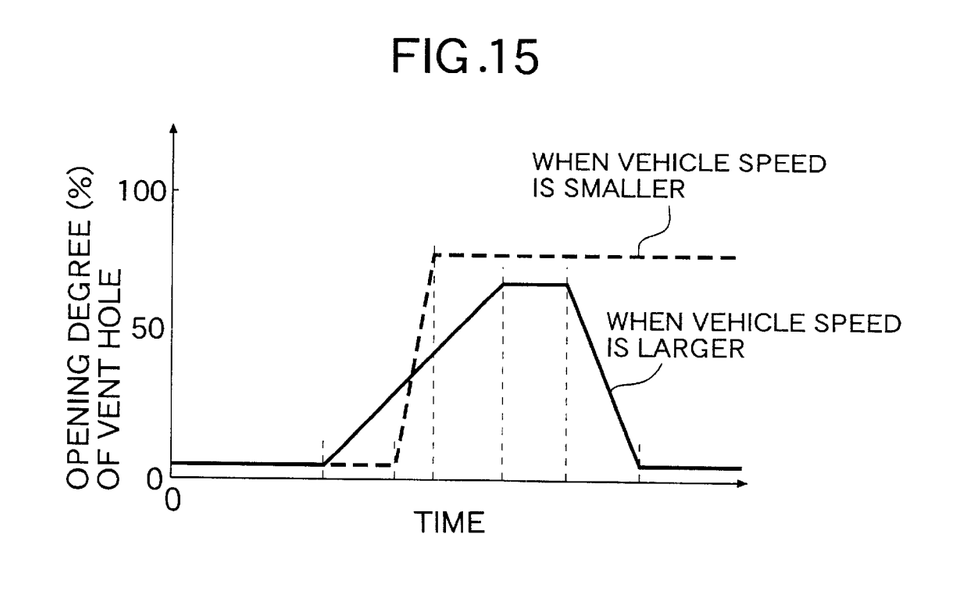
FIG. 15 is a diagram showing a variation in opening pattern for the vent hole due to the vehicle speed.

The opening pattern of the vent hole 29 is changed in accordance with the result of detection provided by the vehicle speed detecting means 35c. More specifically, as shown in FIG. 15, when the vehicle speed at the collision of the vehicle is smaller, a required restraining force is also smaller and hence, the fully opening degree of the vent hole 29 is set at a larger value, and such fully opening degree is maintained to the last. Thus, the maximum value of the restraining load received by the occupant from the air bag 21, 48 can be decreased to restrain the occupant more softly.

Although the embodiments of the present invention have been described in detail, it will be understood that the present invention is not limited to the above-described embodiment, and various modifications in design may be made without departing from the spirit and scope of the invention defined in claims.

For example, the piezoelectric element 33 has been illustrated as an actuator in the embodiment, but another type of an actuator, such as a linear solenoid, a rotary solenoid, an electric motor, and the like, may alternatively be employed. The shape of the vent hole 29, the shape of the valve member 32 of the control valve 30 and the shape of the piezoelectric element 33 (actuator) are also not limited to those shown in the illustrated embodiment and may be changed suitably. The structure of the hinge portion 32b may be such that the valve member 32 is swingably supported at a location near one end thereof by a pin.

What is claimed is:

1. An air bag device for a vehicle, comprising:

a retainer, a folded up air bag having an opening, a peripheral edge of which is fixed to said retainer, an inflator in said retainer operative to deploy said air bag to restrain an occupant by a gas generated therein upon collision of said vehicle, said retainer having a vent hole and a control valve for closing said vent hole, said control valve including a valve member having a portion hingedly connected to said retainer, an actuator provided on said hingedly connected portion, and means for controlling a supply of electric current to said actuator to controllably bend said valve member at said hingedly connected portion to regulate the degree of opening of said vent hole.

2. An air bag device according to claim 1, wherein said actuator is a piezoelectric element.

3. An air bag device according to claim 1, wherein said valve member of said control valve covers said vent hole from the outside of said retainer.

* * * * *